No. 717,420. Patented Dec. 30, 1902.
G. LEESON.
DRIVE WELL POINT AND STRAINER.
(Application filed Jan. 31, 1902.)
(No Model.)
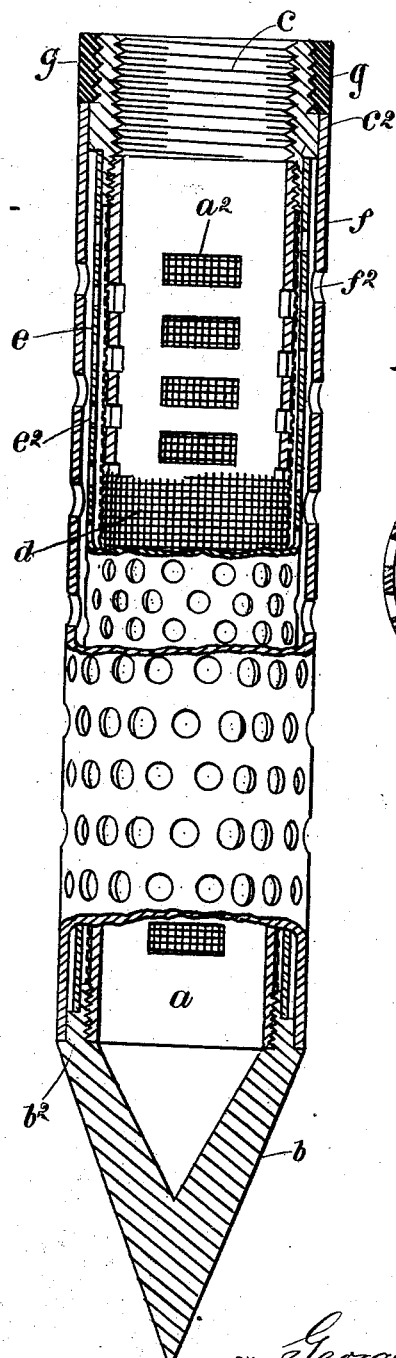
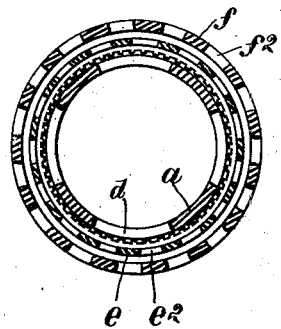
WITNESSES
INVENTOR
BY George Leeson
ATTORNEYS

UNITED STATES PATENT OFFICE.

GEORGE LEESON, OF LAKE CITY, MINNESOTA.

DRIVE-WELL POINT AND STRAINER.

SPECIFICATION forming part of Letters Patent No. 717,420, dated December 30, 1902.

Application filed January 31, 1902. Serial No. 91,977. (No model.)

*To all whom it may concern:*

Be it known that I, GEORGE LEESON, a citizen of the United States, residing at Lake City, in the county of Wabasha and State of Minnesota, have invented certain new and useful Improvements in Drive-Well Points and Strainers, of which the following is a full and complete specification, such as will enable those skilled in the art to which it appertains to make and use the same.

The object of this invention is to provide an improved drive-well point and strainer which is simple in construction and operation and strong and durable and provided with improved straining facilities in order to increase the capacity thereof for moving water to the surface of the ground, a further object being to provide a device of this class with a removable jacket or shield, whereby the device may be easily cleaned whenever necessary; and with these and other objects in view the invention consists in a drive-well point and strainer constructed as hereinafter described and claimed.

In the drawings forming part of this specification, in which the separate parts of my improvement are designated by the same reference characters in each of the views, Figure 1 is a central side elevation of a drive-well point and strainer made according to my invention, and Fig. 2 a cross-section thereof.

In the practice of my invention I provide a strong central tube $a$, with one end of which is connected the point $b$, the other end thereof being provided with a coupling $c$, and the point $b$ and coupling $c$ are screwed onto the tube $a$, and said tube is provided with holes or openings $a^2$, any desired number of which may be employed and which may be of any desired size and arranged in any preferred manner, the preferred arrangement being that shown, in which said holes are formed transversely of the tube.

Around the tube $a$ is placed a tubular screen $d$, composed of wire-gauze, and around the tubular screen $d$ is placed a supplemental strainer $e$, composed of a metal tube provided with perforations $e^2$, any desired number of which may be employed; but these perforations in practice are preferably distributed throughout the entire surface of the supplemental strainer $e$.

Around the supplemental strainer $e$ is placed an outer movable shield or jacket $f$, which also serves as a strainer and which is also tubular in form and composed of steel or any other suitable metal, and said shield and jacket $f$ are provided with perforations $f^2$, which are distributed throughout the entire surface thereof. The inner end of the coupling $c$ and the end of the point $b$ which is connected with the tube $a$ are provided with successive enlargements, as shown at $b^2$ and $c^2$, whereby the wire-gauze strainer $d$, the supplemental strainer $d^2$, and the outer shield and jacket $f$ are separated by narrow spaces, as clearly shown in the drawings, and these spaces facilitate the passage of water into the tube $a$, as will be readily understood.

The outer shield or jacket $f$ is made of considerable thickness, so as to give the necessary strength thereto, and said shield or jacket is preferably loosely connected with the coupling $c$ and the point $b$, so as to be easily removable, and said shield or jacket is held in place by a collar $g$, screwed into the coupling $c$, with which in practice the well-tube is connected, and the jacket $f$ may be removed at any time by detaching the collar $g$.

My removable jacket for drive-well points constitutes a protection therefor, especially in driving or drilling through any hard substance—such as gravel, baked sand, clay, or rocks—and may be used on a drive-well point of any size and construction.

My invention is not limited to the method of connecting the parts or members $a$, $b$, $e$, and $f$ with the coupling $c$ and the point $d$, and any preferred means may be employed for this purpose.

Having thus fully described my invention, what I claim as new, and desire to secure by Letters Patent, is—

1. A drive-well point and strainer comprising a central tube provided with perforations or openings, a coupling $c$ with which one end of said tube is detachably connected, a point $b$ detachably connected with the opposite end of said tube, a wire-gauze strainer mounted on said tube, a supplemental tubular strainer inclosing the wire-gauze strainer, and an outer removable perforated shield or jacket inclosing the supplemental strainer, said shield or jacket being removable and held in place by a collar *g* connected with the coupling *c*, substantially as shown and described.

2. A drive-well point and strainer comprising a central tube provided with perforations or openings, a coupling *c* with which one end of said tube is detachably connected, a point *b* detachably connected with the opposite end of said tube, a wire-gauze strainer mounted on said tube, a supplemental tubular strainer inclosing the wire-gauze strainer, and an outer removable perforated shield or jacket inclosing the supplemental strainer, said shield or jacket being removable and held in place by a collar *g* connected with the coupling *c*, the wire-gauze strainer, the supplemental tubular strainer, and the outer removable perforated shield or jacket being separated by annular spaces, substantially as shown and described.

In testimony that I claim the foregoing as my invention I have signed my name, in presence of the subscribing witnesses, this 25th day of January, 1902.

GEORGE LEESON.

Witnesses:
OTTO E. ANDERSON,
S. O. SEWALL.